United States Patent [19]

Snyder

[11] Patent Number: 4,918,726
[45] Date of Patent: Apr. 17, 1990

[54] LINE POWERED UNIVERSAL TELEPHONE AMPLIFIER

[76] Inventor: Gary K. Snyder, 1011 E. Calle Monte Vista Dr., Tempe, Ariz. 85284

[21] Appl. No.: 335,741

[22] Filed: Apr. 10, 1989

[51] Int. Cl.$^4$ .............................................. H04M 1/60
[52] U.S. Cl. .................................... 379/395; 379/387; 381/111
[58] Field of Search ................ 379/395, 387; 381/111, 381/112, 113, 114

[56] References Cited

U.S. PATENT DOCUMENTS

| | | | |
|---|---|---|---|
| 2,891,110 | 6/1959 | Miller | 379/395 |
| 3,046,353 | 7/1962 | Tschumi | 379/395 |
| 3,180,937 | 4/1965 | Moser | 379/395 |
| 3,700,831 | 10/1972 | Aagaard et al. | 379/395 |
| 4,757,545 | 7/1988 | Rosander | 381/113 |

Primary Examiner—Jin F. Ng
Assistant Examiner—Jhancy Augustus
Attorney, Agent, or Firm—Tod R. Nissle

[57] ABSTRACT

An amplification device which enables an electret handset microphone, a dynamic handset microphone, or a carbon handset microphone to be connected to either an electronic telephone or to a hybrid coil telephone. The amplification device is powered from current from the line connecting the telephone to a KSU, PBX, or other telephone servicing system.

5 Claims, 4 Drawing Sheets

LINE POWERED UNIVERSAL TELEPHONE AMPLIFIER

This invention relates to an amplification device for interfacing between a telephone and the handset microphone normally attached to the telephone.

More particularly, the invention relates to an amplification device which enables an electric handset microphone, a dynamic handset microphone, or a carbon handset microphone to be connected to either an electronic telephone or to a hybrid coil telephone.

In a further respect, the invention relates to an amplification device which interfaces between a telephone and the handset microphone normally attached to the telephone and which is powered from current from the line connecting the telephone to a KSU, PBX or other telephone servicing system.

Recent years have witnessed the advent of a variety of telephone devices and of telephone lines which deliver power to telephones in residential and business areas. An individual or business can utilize a variety of microphones in the handset of a telephone, including the carbon handset microphone, an electret handset microphone and a dynamic handset microphone. The carbon handset microphone is utilized in a hybrid coil type telephone, while the electret and dynamic microphones are utilized in electronic telephones. The existence of the various types of telephones and of handset microphones makes integration of off-the-shelf telephones with off-the-shelf handsets difficult because a carbon handset microphone cannot be utilized with an electronic telephone, a dynamic handset microphone cannot be utilized with a hybrid coil telephone, etc.

Another problem encountered with present day telephone systems is that power is, depending on the particular telephone being utilized, carried on different wire pairs in the telephone line which is connected to the telephone. For example, a typical "skinny wire" system includes two or more pairs of wire. Voice and data signals are on the first two pair of wires while power is on the third pair. In other systems, power may be on the first, second or fourth pair of wires.

Accordingly, it would be highly desirable to provide an improved telephone system which would enable a carbon, electret or dynamic handset microphone to be utilized with either a hybrid coil or electronic telephone and which would enable the telephone system readily to be utilized in a conventional telephone line having four pairs of wire, regardless of which wire pair carries the power.

Therefore, it is a principal object of the invention to provide an improved telephone system.

Another object of the invention is to provide an amplification device which interfaces between a telephone and the handset microphone normally attached to the telephone, and which permits a carbon, electret or dynamic handset telephone to be utilized with either a hybrid coil telephone or electronic telephone.

A further object of the invention is to provide an amplification device which can, regardless of the wire pair carrying the power, be readily connected to any conventional incoming telephone line having up to four wire pairs.

Still another object of the instant invention is to provide an application device of the type described which is powered from current carried in the line connecting a telephone to a KSU, PBX or other telephone servicing system.

These and other, further and more specific objects and advantages of the invention will be apparent to those skilled in the art from the following detailed description thereof, taken in conjunction with the drawings, in which.

Figure 1:
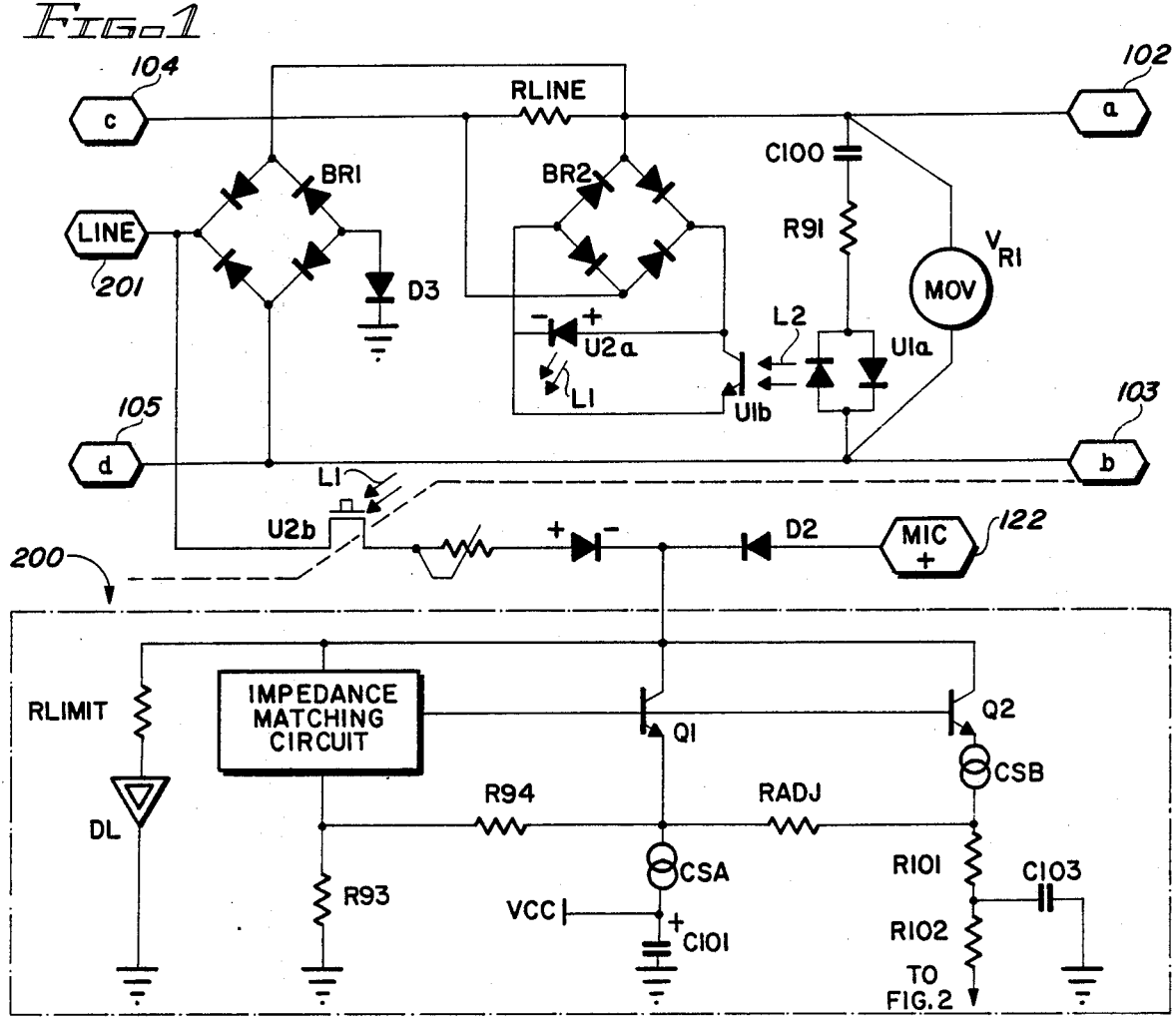
FIG. 1 is a schematic diagram illustrating a portion of the circuitry in an amplification device embodying the principles of the invention, the circuitry providing the power necessary to operate said amplification device.

Briefly in accordance with my invention, I provide an improved amplification device utilized in combination with a telephone system. The telephone system includes a telephone device selected from the group consisting of a hybrid coil telephone and an electronic telephone; a system for servicing the telephone device; a telephone handset microphone normally connected to the telephone device and selected from the group consisting of an electret microphone, a dynamic microphone, and a carbon microphone; and, a telephone line interconnecting the telephone device and the telephone device servicing system and including at least two pairs of wires. The amplification device interfaces the telephone handset microphone and the telephone device. The amplification device includes current shunting means; microphone output transmission means; and, means for connecting the amplification device to the handset microphone and intermediate the handset microphone and the telephone device such that output from the microphone passes through the microphone output transmission means to the telephone device, and, for connecting the amplification device to the telephone line and intermediate the telephone line and telephone device such that power in the telephone line passes through said current shunting means to the telephone device. The current shunting means shunts a selected amount of the power from the telephone line to operate the microphone output transmission means. The microphone output transmission means includes switch means to connect said microphone output to a first amplifier means when said microphone is a carbon microphone, and to a second amplifier means when said microphone is selected from the group consisting of an electret microphone and a dynamic microphone; summing means for summing the signals from the first and second amplifier means to produce an output signal; and, interface means for transmitting the output signal from the summing means to the telephone device.

The current shunting means can include current shunting circuitry having a pair of inputs and a pair of outputs, current entering said circuitry through the inputs, the circuitry shunting a selected proportion of the current entering through the inputs, and the remaining unshunted proportion of the current exiting the shunting circuitry through the outputs; a first housing means; and, a second housing means. The first housing means carries at least first and second pin grid arrays. Each pin grid array includes a first pair of pins each connected to one of the inputs of the current shunting circuitry means; a second pair of pins each connected to one of the pairs of wires in the telephone lines; a third pair of pins each connected to one of the pair of wires in the telephone device; and, a fourth pair of wires each connected to one of the outputs of the current shunting circuitry means. The pins in the first pin grid array are in a selected orientation with respect to one another, and the orientation of the pins in the second pin grid array corresponds to the orientation of the pins in the first pin grid array. The second housing means carries at least first and second socket grid arrays each including a first pair of sockets each contacting a separate one of the first pair of pins in one of the pin grid arrays; a second pair of sockets each contacting a separate one of said second pair of pins in one of the pin grid arrays; a third pair of sockets each contacting a separate one of said third pair of pins in one of the pin grid arrays; and, a fourth pair of sockets each contacting a separate one of the fourth pair of pins in one of the pin grid arrays. Each of the first sockets in the first socket grid array is connected to a different one of the second sockets in the first socket grid array. Each of the third sockets in the first socket grid array is connected to a different one of the fourth sockets in the first socket grid array. Each of the second sockets in the second socket grid array is connected to a different one of the third sockets in the second socket grid array. The first and second housing means have at least two operative positions, a first operative position with the pins in the first pin grid array contacting the sockets in the first socket grid array and with the pins in the second pin grid array contacting the sockets in the second socket grid array; and, a second operative position with the pins in the first pin grid array contacting the sockets in the second socket grid array and with the pins in the second pin grid array contacting the sockets in the first socket grid array.

Figure 5:
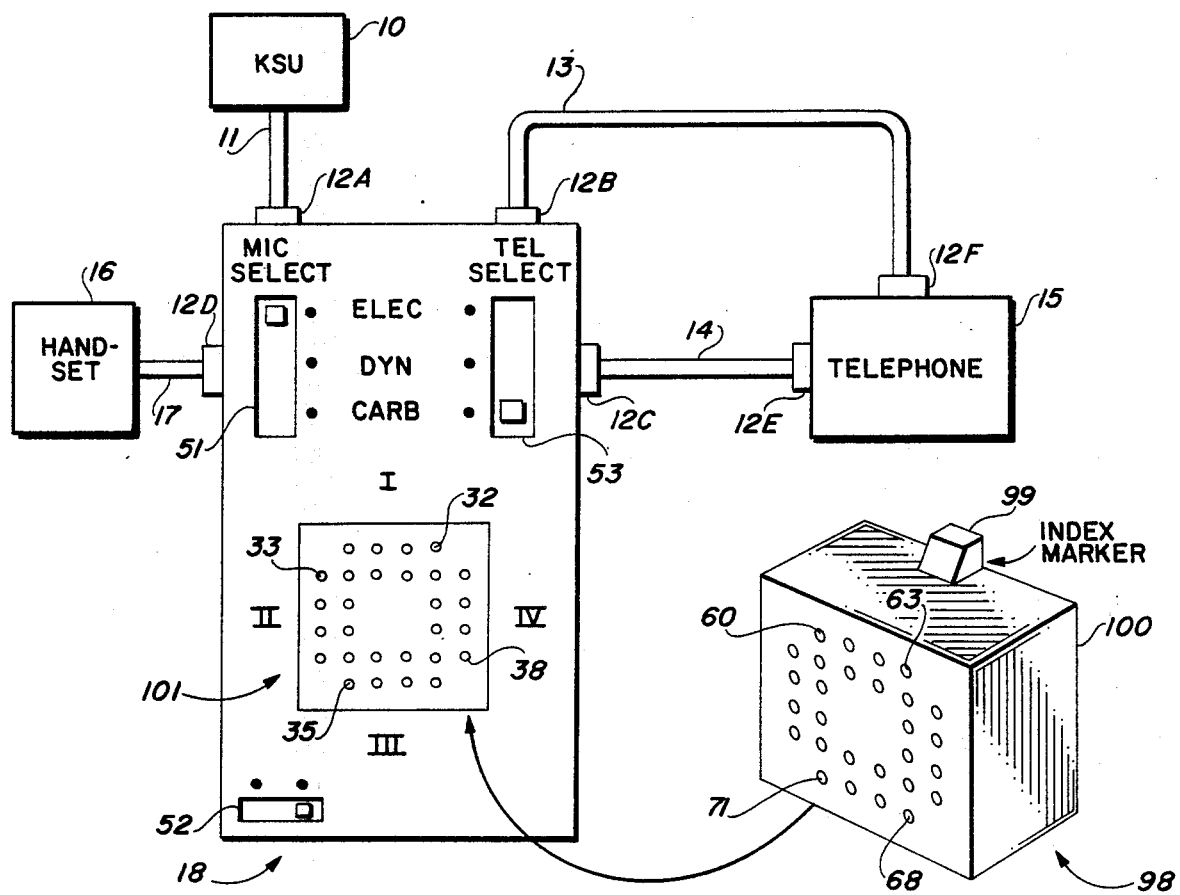
FIG. 5 is an assembly view illustrating the integration of the amplification device of the invention with a telephone, telephone handset, and incoming telephone line, and also further illustrating the module switching matrix utilized to determine which pair of wires in the incoming telephone line is carrying power to operate the telephone.

Turning now to the drawings, which depict the presently preferred embodiments and the best mode of the invention for the purpose of illustrating the practice thereof and not by way of limitation of the scope of the invention, and in which like reference characters represent corresponding elements throughout the several views, FIG. 5 illustrates an amplification device 18 constructed in accordance with th principles of the invention. Amplification device 18 is connected to incoming telephone 11 with quick release jack 12A. Line 11 is connected to KSU 10 or to a key service unit, a PBX or other similar system which services peripheral telephone devices 15. For sake of the discussion herein, it is assumed that line 11 includes four pairs of wires: a green-red pair, a black-yellow pair, a brown-orange pair, and a gray-blue pair. The four wire line 17 from handset 16 is connected to amplification device 18 by quick release jack 12D. Line 13 interconnecting telephone device 15 and amplification device 18 is connected to device 18 with quick release jack 12B and is connected to telephone device 15 by quick release jack 12F. Line 14 interconnecting device 18 and telephone device 15 is attached to device 18 by quick release jack 12C and is connected to telephone device 15 with quick release jack 12E.

FIG. 1 illustrates circuitry which shunts a selected proportion of the current traveling through lines 11 and 13 to telephone device 15. Current entering device 18 from line 11 is directed by terminal 101 and module 98 to contacts 102 and 103. Current flows between contacts 102 and 104 and contacts 103 and 105, through terminal 101 and module 98, through jack 12B and line 13 to telephone device 15. The shunting of current from telephone line 11 to the circuitry of FIG. 1 is further described with reference to FIG. 6.

Figure 6:
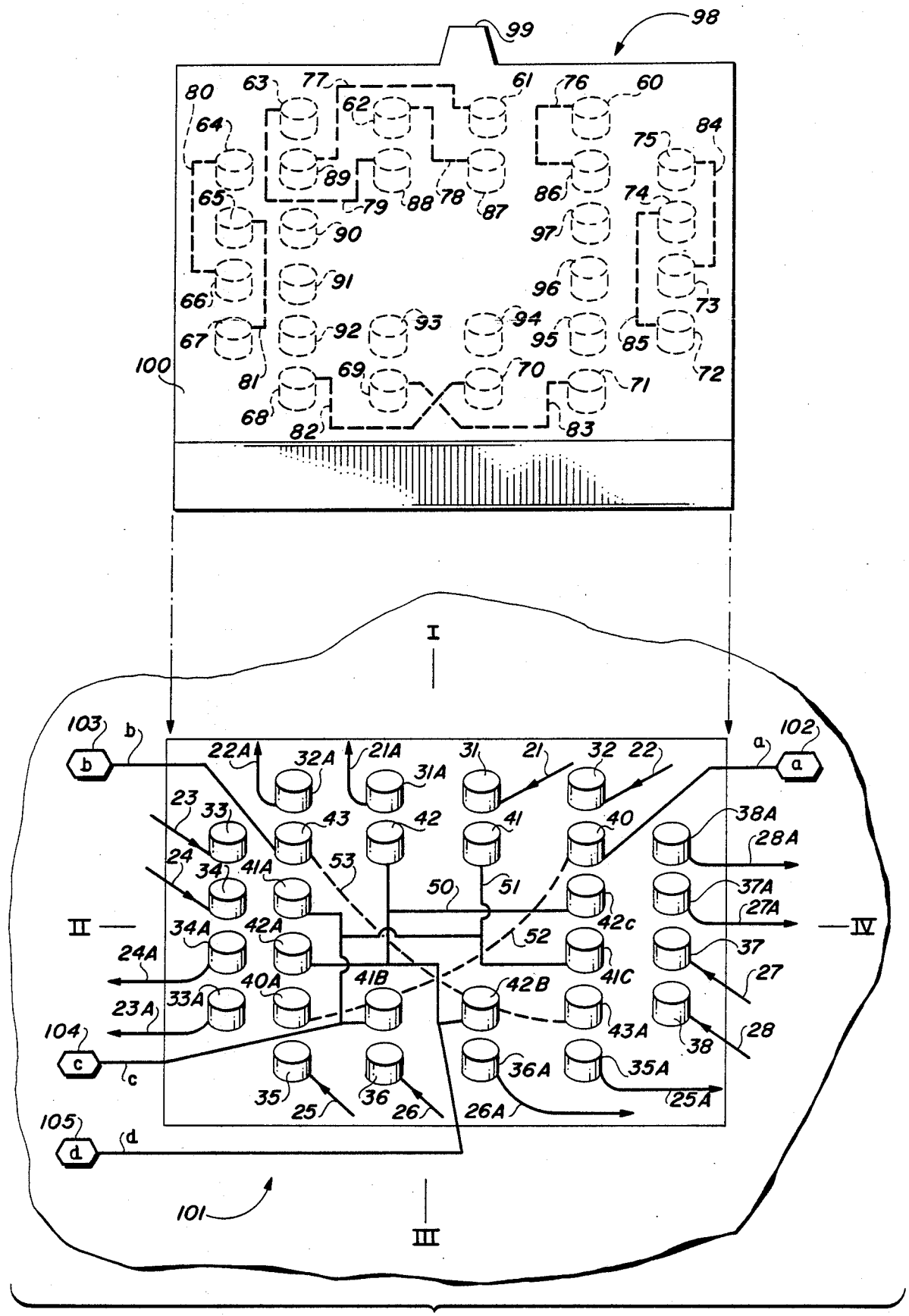
FIG. 6 is an exploded assembly view illustrating further construction details of the power selection module of FIG. 5; and, FIG. 7 is a perspective view illustrating an alternate switching matrix utilized to determine which pair of wires in the incoming telephone line is carrying power to operate the telephone.

In FIG. 6, terminal 101 includes four pin grid arrays. The first pin grid array includes pins 31, 32, 31A, 32A, 40, 41, 42, 43. The second pin grid array includes pins 33, 34, 34A, 33A, 40A, 41A, 42A, and 43. Pin 43 is common to the first and second pin grid arrays. The third pin grid array includes pins 35, 36, 35A, 36A, 40A, 41B, 42B, and 43A. Pin 40A is common to the second and third pin grid arrays. The fourth pin grid array includes pins 37, 38, 37A, 38A, 40, 42C, 41C, and 43A. Pin 40 is common to the first and fourth pin grid arrays. Pin 43A is common to the third and fourth pin grid arrays. Pins 41, 41A, 41B, and 41C are all interconnected by wiring 51. Pins 42, 42A, 42B, and 42C are all interconnected by wiring 50. Wiring 52 interconnects pins 40 and 40A. Wiring 53 interconnects pins 43 and 43A. Wiring 51 is interconnected to electrical contact 104 by wiring c. Wiring 50 is interconnected to electrical contact 105 by wiring d. Pin 43 (and consequently pin 43A) is connected to electrical contact 103 by wiring b. Pin 40 (and consequently pin 40A) is connected to electrical contact 102 by wiring a.

Module 98 of FIG. 6 includes a first socket grid array comprised of sockets 60, 61, 62, 63, 86, 87, 88, 89; includes a second socket grid array comprised of sockets 64, 65, 66, 67, 89, 90, 91, 92; a third socket grid array comprised of sockets 68, 69, 70, 71, 92, 93, 94, 95; and, a fourth socket grid array 72, 73, 74, 75, 95, 96, 97, 86. Socket 86 is common to the first and fourth socket grid arrays. Socket 95 is common to the third and fourth socket grid arrays. Socket 92 is common to the second and third socket grid arrays. Socket 89 is common to the first and second socket grid arrays.

In the first socket grid array, wiring 77 interconnects sockets 61 and 89. Wiring 76 interconnects sockets 60 and 86. Wiring 79 interconnects sockets 88 and 63 Wiring 78 interconnects sockets 62 and 87.

In the second socket grid array, wiring 80 interconnects sockets 64 and 66. Wiring 81 interconnects sockets 65 and 67.

In the third socket grid array wiring 82 interconnects sockets 68 and 70. Wiring 83 interconnects sockets 69 and 71.

In the fourth socket grid array, wiring 84 interconnects sockets 73 and 75. Wiring 85 interconnects sockets 72 and 74.

Each of the sockets in the four socket grid arrays of module 98 is of equivalent shape and dimension. The orientation of the eight sockets in the first socket grid array of module 98 is identical to the orientation of the sockets in each of the second, third and fourth socket grid arrays of module 98. As used herein, the term orientation refers both to the spacing of the sockets with respect to one another and to the orientation of each socket about a centerline which is parallel to the centerlines of the other sockets. Each cylindrical socket has a centerline circumscribed by the cylindrical wall of the socket.

As an example of the corresponding orientations of the sockets in the first and second socket grid arrays, the distance between socket 60 and socket 86 is identical to the distance between sockets 64 and 89; the distance between socket 60 and 61 is identical to the distance between socket 64 and socket 65; the distance between socket 60 and socket 62 is identical to the distance between socket 64 and socket 66; the distance between socket 60 and socket 88 is identical to the distance between socket 64 and socket 91; etc.

Each of the pins of the four pins grid arrays of terminal 101 is of equivalent shape and dimension and is slidably received by a socket in module 98. The orientation of the eight pins in the first pin grid array of terminal 101 is identical to the orientation of the pins in each of the second, third, and fourth pin grid arrays of terminal 101. As used herein, the term orientation refers both to the spacing of the pins with respect to one another and the orientation of each pin about a centerline which is parallel to the centerlines of the other pins. Each cylindrical pin has a centerline circumscribed by the cylindrical wall of the pin.

While module 98 and terminal 101 are, for the sake of clarity, illustrated as having sockets and pins, respectively, the terms "pin" and "socket" should be broadly construed herein and in the Claims to mean, respectively, "first electrical contact" and "second electrical contact". The sockets in module 98 could be replaced by pins when the pins on terminal 101 are replaced by sockets. Any other type of electrical contacts could be substituted for the pins and sockets as long as the terminal 101 and module 98, when contacted with one another in a selected operative position, route currents and signals in the manner described below.

The first, second, third and fourth pin grid arrays of terminal 101 collectively comprise a symmetrical pin arrangement The first, second, third and fourth socket grid arrays of module 98 collectively comprise a symmetrical socket arrangement.

In FIG. 6 wires 21 and 22 lead from jack 12A to pins 31 and 32 and comprise the first or "inside" pair of wires, i.e. comprise the red and green wires. Wires 23 and 24 lead from jack 12A to pins 33 and 34 and comprise the second pair or black wire and yellow wire. Wires 25 and 26 lead from jack 12A to pins 35 and 36 and comprise the third pair or brown wire and orange wire, respectively. Wires 27 and 28 lead from jack 12A to pins 37 and 38 and comprise the fourth pair of gray and blue wires respectively. Wires 22A and 21A connect pins 31A and 32A to jack 12B. Wires 24A and 23A connect pins 33A and 34A to jack 12B. Wires 26A and 25A connect pins 36A and 35A to jack 12B. Wires 27A and 28A connect pins 37A and 38A to jack 12B.

Since the orientations of the pins in module 98 is symmetrical and is generally equivalent to the orientation of the sockets in terminal 101, the sockets in module 98 can be slidably removably pressed on to the pins of terminal 101 when pointer 99 of module 98 is directed in one of four positions toward Roman Numeral I, II, III, or IV. In FIG. 6, pointer 99 is directed toward Roman Numeral I, and when module 98 is pressed onto the pins of terminal 101, sockets 60, 61, 62, 63 slidably receive pins 32, 31, 31A and 32A, respectively; sockets 86, 87, 88, 89 slidably receive pins 40, 41, 42, 43, respectively; sockets 64, 65, 66, 67 slidably removably receive pins 33, 34, 34A, and 33A respectively; etc. Each pin of terminal 101 is slidably removably received by an opposing socket in module 98.

When module 98 is pressed onto terminal 101 with pointer 99 directed toward Roman Numeral I, the amplification device 18 will operate if power is present on incoming lines 21 and 22. Lines 21 and 22 represent the first wire pair which includes a red wire and a green wire. If power is present on lines 21 and 22, then the current in line 21 travels through pin 31, socket 61, wire 77, socket 89, pin 43, wire b and electrical contact 103. Current in line 22 travels through pin 32, socket 60, wire 76, socket 86, pin 40, wire a and contact 102. The circuit of FIG. 1 removes a selected portion of the current and permits the remaining current to exit to telephone device 15. As shown in FIG. 6, current at output 104 travels through wire c, wiring 51, pin 41, socket 87, wire 78, socket 62, pin 31A and wire 21A to jack 12B, wire 13 and telephone device 15. Current at output 105 travels through wire d, wiring 50, pin 42, socket 88, wire 79, socket 63, pin 32A and wire 22A to jack 12B, wire 13 and telephone device 15. When module 98 is attached to terminal 101 with pointer 99 directed toward Roman Numeral I, the amplification device 18 will receive current and function if power is on lines 21 and 22. If power is on line pair 23 and 24, line pair 25 and 26, or line pair 27 and 28, the amplification device 18 will not function.

In FIG. 1, when the handset 16 is removed from telephone device 15 and is "off hook", current starts to flow between contacts 102 and 103 and contacts 104 and 105, to jack 12B, through line 13, and to telephone device 15.

If telephone 15 is ringing and handset 16 is "on hook", then in FIG. 1 the ring signal, which is sinusoidal, passes through capacitor C100 and transistor U1b turns on. When there is loop voltage across resistor RLINE there is a voltage drop across optodiode U2a which energizes diode U2a. When U2a is energized switch U2b is turned on. The purpose of the ring detector switch inhibit circuit, which includes transistor U1b and diodes U1a, is to detect ringing and make the diode U2a impotent. Transistor U1b is tied across and shorts diode U2a to prevent U2a from energizing switch U2b. If transistor U1b did not short diode U2a then during ringing diode U2a would energize switch U2b and the ring signal would rectify through bridge BR2 and current sources CSA and CSB would be delivering power as if the telephone 15 were off hook. The use of resistor RLINE in the circuit is optional. The actual voltage drop can be achieved by the bulk resistance of the optodiode 2a.

If the handset 16 is removed from telephone 15, current starts to flow between a and c and d and b. As loop current flows, the polarity across BR2 guarantees that the voltage drop across RLINE appears across U2a in the proper polarity to energize U2a. Diode U2a is forward biased and generates a light pulse L1 which goes through a gel barrier and turns on switch U2b. The gel functions like an optical fiber.

As noted above, when telephone 15 is ringing, U1a produces light signal or pulse L2 which is received by and activates U1b. U1b makes U2a impotent. When handset 16 is lifted from telephone 15, then the Central Office (CO), PBX, or other telephone servicing system stops, within milliseconds, the ring signal and produces a dial tone for telephone 15. As soon as a dial tone is provided telephone 15, U2a produces a light pulse L1 which activates switch U2b.

When the power is on lines 23 and 24, the amplification device 18 will function when module 98 is first positioned with pointer 99 directed toward Roman Numeral II and then pressed onto terminal 101 so the sockets of module 98 each slidably receive a pin of terminal 101.

When power is on lines 25 and 26, the amplification device 18 will receive current and function when module 98 is first positioned with pointer 99 directed toward Roman Numeral III and is then pressed onto terminal 101 so the sockets of module 98 each slidably receive a pin of terminal 101.

When power is on lines 27 and 28, the amplification device 18 will receive current and function when module 98 is first positioned with pointer 99 directed toward Roman Numeral IV and is then pressed onto terminal 101 so the sockets of module 98 each slidably receive a pin of terminal 101. When pointer 99 is directed toward Roman Numeral IV, socket 60 will receive pin 38. When pointer 99 is directed toward Roman Numeral III, socket 60 receives pin 53. When pointer 99 is directed toward Roman Numeral II, socket 60 receives pin 33.

Electrical contacts 102 and 103 in FIG. 1 receive current when module 98 is pressed onto terminal 101 in the manner described above in the proper orientation with pointer 99 in the proper position to receive power from the pair of wires in line 11 carrying current to operate telephone device 15. Depending on which pair of the eight incoming wires carries the power, the module 98 will permit the power to flow through contacts 102, 103, 104, and 105 when the pointer 99 of module 98 is directed to the proper one of Roman Numerals I, II, III, IV.

In FIG. 1, bridge BR1 provides a rectified output and functions as a polarity guard to insure that a positive potential appears on the anode, or triangle side, of diode D1 and to insure that D1 is forward biased. Therefore, when loop current is flowing between a and c and between d and b, U2a is energized or is, effectively, shorted. BR1 draws current once U2b is shorted, and current begins flowing through diode D1 and resistor R100 into current array 200. Bridge BR1 permits current to be shunted in parallel with the LINE201. If U2b were not energized, then, in effect bridge BR1 would be open and there would be no current flowing through diode D1 and resistor R100.

Current array 200 includes current sources CSA and CSB and LED (light emitting diode) DL. Diode DL turns on when there is a selected voltage, presently 1.2 volts. DL functions like a Zener diode and is a precision voltage regulator, DL, when it is turned on, produces a very minor change in voltage. The voltage on DL preferably stays in the range of 1.1 to 1.3 volts. The use of diode DL and resistor RLIMIT in the circuit is optional.

When carbon microphone is in handset 16, current will flow through current source CSB. Preferably 2.0 milliamps will flow through current source CSB, resistor R101, and resistor R102. When current passes through a carbon microphone the carbon granules in the microphone make the current fluctuate. Capacitor C103 insures current passing through a carbon microphone can not reflect back into transistor Q2. Current source CSB has a very high impedance. Capacitor C101 functions to insure that VCC is relatively stable. All current other than the current flowing through current source CSB is allocated through current source CSA to drive the other circuits in the amplification device 18. Current source CSA typically provides 5 ma (milliamps) to 7 ma of current. VCC provides power when a electret or dynamic microphone is utilized in handset 16.

Figure 2:
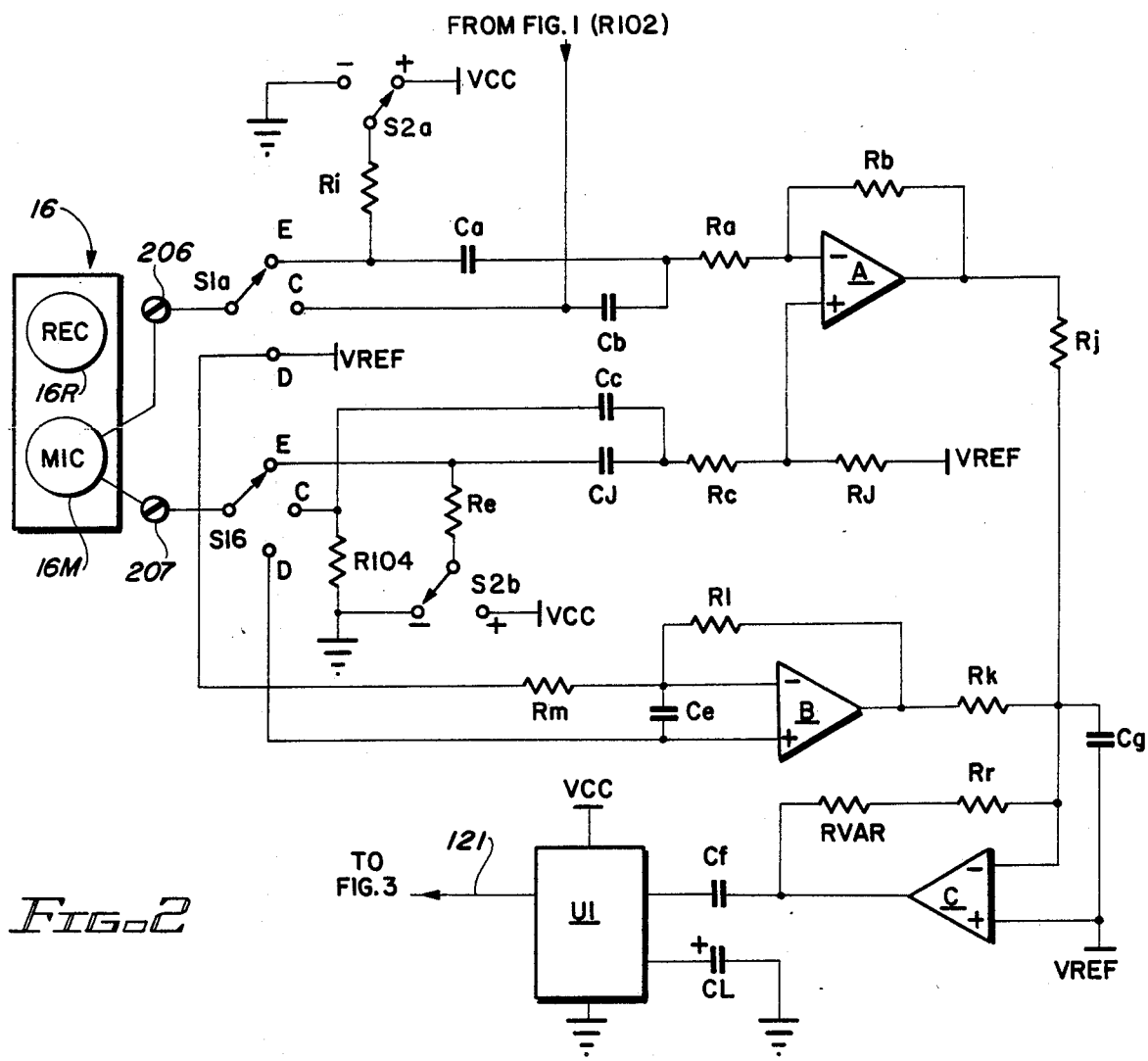
FIG. 2 is a schematic diagram illustrating a portion of the circuitry in an amplification device embodying the principles of the invention, the circuitry of FIG. 2 enabling the amplification device to interface with an electret, a dynamic, or a carbon handset microphone.

In FIG. 2, microphone 16M of handset 16 is connected to double pull, triple pole switches S1a and S1b. When switch S1 (FIG. 5) on the bottom of amplification device 18 is moved to one of the "ELEC", "DYN" and "CARB" positions, switches S1a and S1b are thrown simultaneously. In FIG. 2, amplifier A provides gain, has a differential input and has a differential output. When switches S1a and S1b are in the "E" position, they are in the position for an electret handset microphone. Of the carbon, dynamic, and electret microphones, the electret microphone is the only one on which polarity must be observed. Polarity can be reversed using double pole, double throw switch S2 comprised of switches S2a and S2b. S2a and S2b are thrown simultaneously when switch S2 on the bottom of the device 18 is moved from one position to the other. If an individual is utilizing a electret handset microphone, talks into the microphone and hears nothing, he moves switch S2 to its other position to correct the polarity. The output from switch S1a goes through capacitor Ca and resistor Ra into amplifier A. The output from switch S1b goes through capacitor Cd and resistor Rc into amplifier A. Resistors Ri and Re are utilized to feed current to the electret microphone. In combination switches S1a and resistors Ri and Re enable the generation of an AC signal in the lines leading to amplifier A.

When switches S1a and S1b in FIG. 2 are switched simultaneously to the "C" or carbon microphone position (by moving switch S1 to the "CARB" position), power is drawn from current source CSB through R101 to the carbon handset microphone used as handset microphone 16M. R104 is equal in value to resistors R101 and R102 because it is desirable that the carbon microphone remain symmetrical in the same manner as the electret microphone—both resistors Ri and Re are the same value, so the electret microphone floats between a plus supply and ground. Resistor Rc leads current flow from a carbon microphone to amplifier A because capacitors Cc and Cd provide the capacitive path. The current from a carbon microphone cannot pass through Ca or Cd. Ca and Cd stop direct current.

When switches Sla and Slb are moved simultaneously to the "D" or dynamic microphone position (by moving switch S1 to the "DYN" position), only a minimal amount of voltage is required to operate the dynamic microphone, typically about two volts. VREF is derived from VCC. VREF causes the diaphragm of the dynamic cartridge to oscillate in and out. Since little voltage is required to operate a dynamic handset microphone, the single input to amplifier B is small. Resistors Rm and R1 provide a high gain, which usually equals R1 divided by Rm. The gain is typically in the range of five to fifteen. Capacitor Ce functions as a radio frequency filter.

The outputs of amplifiers A and B are driven into summing amplifier C. Amplifier C is commonly called a summing amplifier even though when amplifier A is on amplifier B is off, and vice versa. Resistor Rn and RVAR enable amplifier C to control the gain. RVAR is a potentiometer which is adjusted with a screwdriver to control gain. For most telephone—handset combinations the gain will be in an expected range and RVAR will not have to be adjusted.

Figure 3:
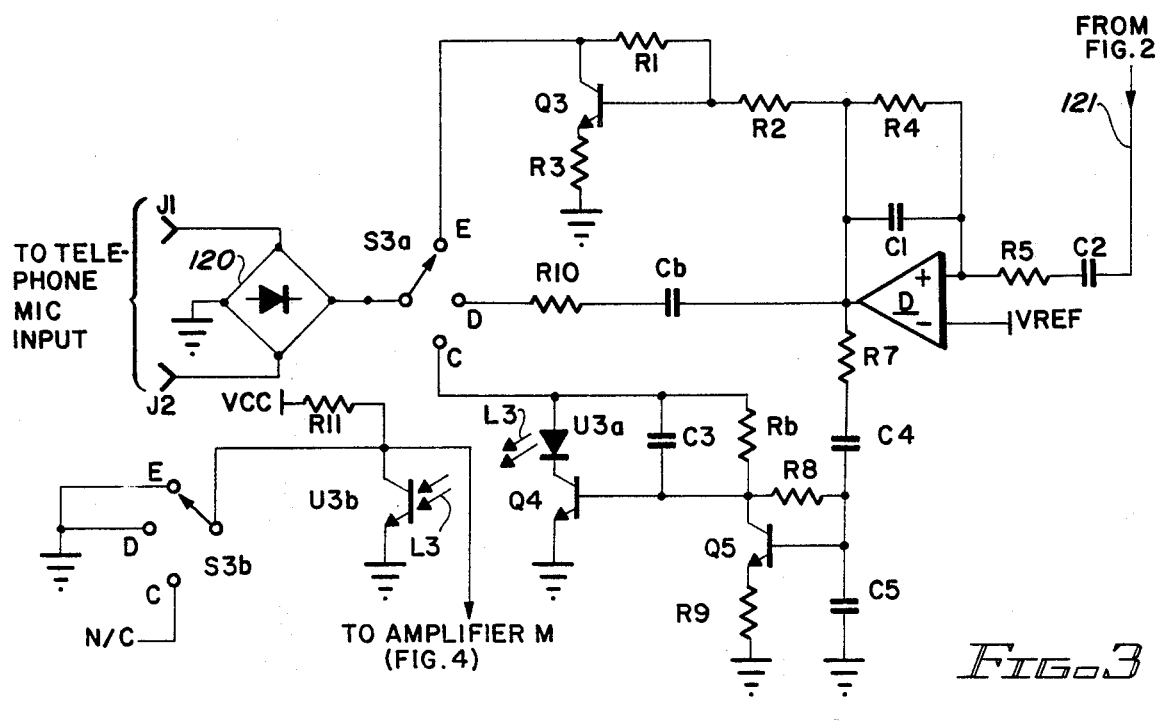
FIG. 3 is a schematic diagram illustrating a portion of the circuitry of an amplification device embodying the principles of the invention, the circuitry of FIG. 3 enabling the amplification device to interface with a telephone.

FIG. 3 illustrates the telephone interface circuitry which make the amplification device of the invention compatible with three types of telephones. Switches S3a and S3b are double pull triple pole switches. J1 and J2 are connected to jack 12C which, through line 14, leads to telephone device 15. 121 represents the signal from the level expander—noise cancelling circuitry U1 of FIG. 2. When switch S3 on the bottom of device 18 (FIG. 5) is set to the "ELEC" position, both switches S3a and S3b and simultaneously move to the "E" or electret telephone position. When switch S3 is set to the "DYN" position, both switches S3a and S3b are simultaneously moved to the "D" or dynamic telephone position. When switch S3 is set to the "CARB" position, switches S3a and S3b are simultaneously moved to the "C" or carbon telephone position.

One of the amplifiers in FIG. 3 includes transistor Q3 and resistors R1, R2 and R3 and interfaces with an electret telephone. When switches S3a and S3b are set to the "D" or dynamic telephone position, capacitors are not utilized and there is only a large resistor R10 to drive the microphone signal. When switches S3a and S3b are set to the "C" or carbon telephone position, transistors Q4 and Q5 are utilized to make a preamp and filter.

When a carbon microphone is utilized as the handset microphone 16M, there is power at 122 in FIG. 3. Consequently, the telephone handset and cord can be hooked into the amplification device and the device 18 can, via line 14, be hooked into the telephone device 15. Power is provided from the carbon microphone. U3a functions as a current detector and as a filter and buffer driving an amplifier to inject and modulate the output from amplifier D onto the line in a format that a carbon telephone can understand. U3b is part of the chip select for the receiver amplifier M in FIG. 4. Amplifier M has a standard non-polarity sensitive input.

Figure 4:
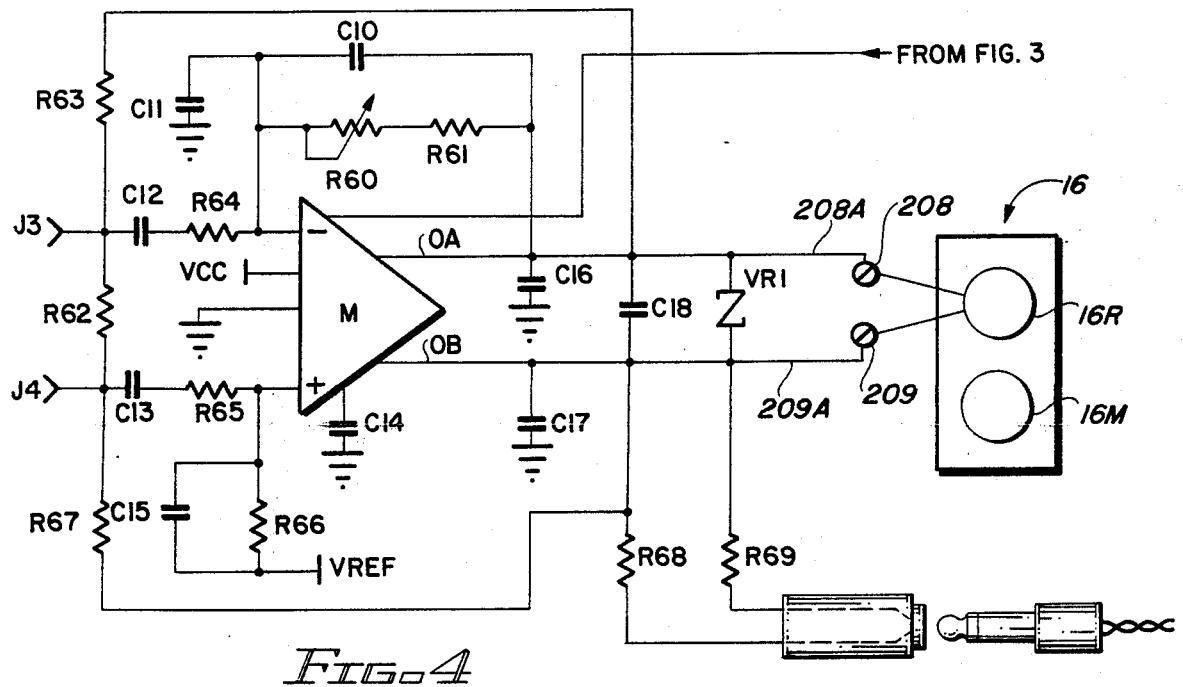
FIG. 4 is a schematic diagram illustrating a portion of the circuitry of an amplification device embodying the principles of the invention, the circuitry of FIG. 4 enabling the amplification device to interface with the receiver in a telephone handset.

In FIG. 4 resistor R62 prevents the signal to J3 and J4 from oscillating. J3 and J4 are attached to jack 12C which, through line 14, leads to telephone device 15. Amplifier M provides gain and a high CMRR (common mode rejection ratio). Amplifier M has a non-polarity sensitive input and provides a double non-polarity sensitive output OA and OB Amplifier M will work at low voltages. Amplifier M is a Motorola MC34119. The circuit of FIG. 4 amplifies higher frequencies and suppresses lower frequencies.

The noise cancelling circuitry U1 of FIG. 2 preferably has a unity gain so that the desirable part of the signal traveling through U1 is largely unaffected.

When a carbon handset microphone is utilized, the signal from amplifier D in FIG. 3 is modulated with the circuit including U3a, Q4, and Q5. This modulating circuit may draw up to twenty-one amps from the telephone device 15 because of the nature of a hybrid phone. A hybrid telephone device is a coil or series of coil that shunts all of the current looped through the phone to the microphone.

In FIG. 3 transistor Q4 is in series with opto coupler U3a and opto coupler U3a acts as a current detector. When switches U3a and U3b are set to "C" current is flowing through Q4, and opto coupler U3a generates light signals L3 which are received by U3b to ground the chip select and keeps the amplifier M on. When a carbon telephone is dialed to make an outgoing call, all the current to the handset microphone 16M is shut off and, consequently, U3a no longer has current going through it and U3b will not be on. This causes the receiver amplifier to be shut off when the carbon telephone is dialed. Shutting off the receiver amplifier M during dialing controls the level of the DTMF signal back to the caller's ear during dialing.

When S3b, which is part of the chip select circuit, is in the "E" (electret) or "D" (dynamic) position, then switch S3b is grounded. Amplifier M is a standard eight pin amplification integrated circuit made by Motorola. It is an integrated circuit receiver which, when the chip select is shut off, is also shut off. When amplifier M shuts off, the outputs OA and OB go to a high impedance state which makes speaker SP1 "float" and become available so the dialing signals come back through J3 and J4 and are routed directly to the receiver SP1 through resistors R63 and R67. R63 and R67 have high values so the DTMF feedback during dialing can be gated around the receiver amplifier M to the speaker SP1. Screws 208 and 209 are used to attach wires 208A and 209B to the receiver 16R of handset 16.

As noted, power from VCC is used to operate other parts of the amplification device 18 and handset 16. Wherever there is a VCC in the circuitry, a resistor can be utilized to take power from VCC. Some circuits do, however, not require a resistor because a current source is incorporated in the circuitry. For example, the noise cancelling circuit U1 has a current source.

In the embodiment of the invention illustrated in FIG. 5, module 98 is manually inserted on and removed from terminal 101. Any desirable mechanical or other means can be provided which will lift module 98 from terminal 101, rotate or move module 98 to a desired position and then press module 98 back onto terminal 101.

Figure 7:
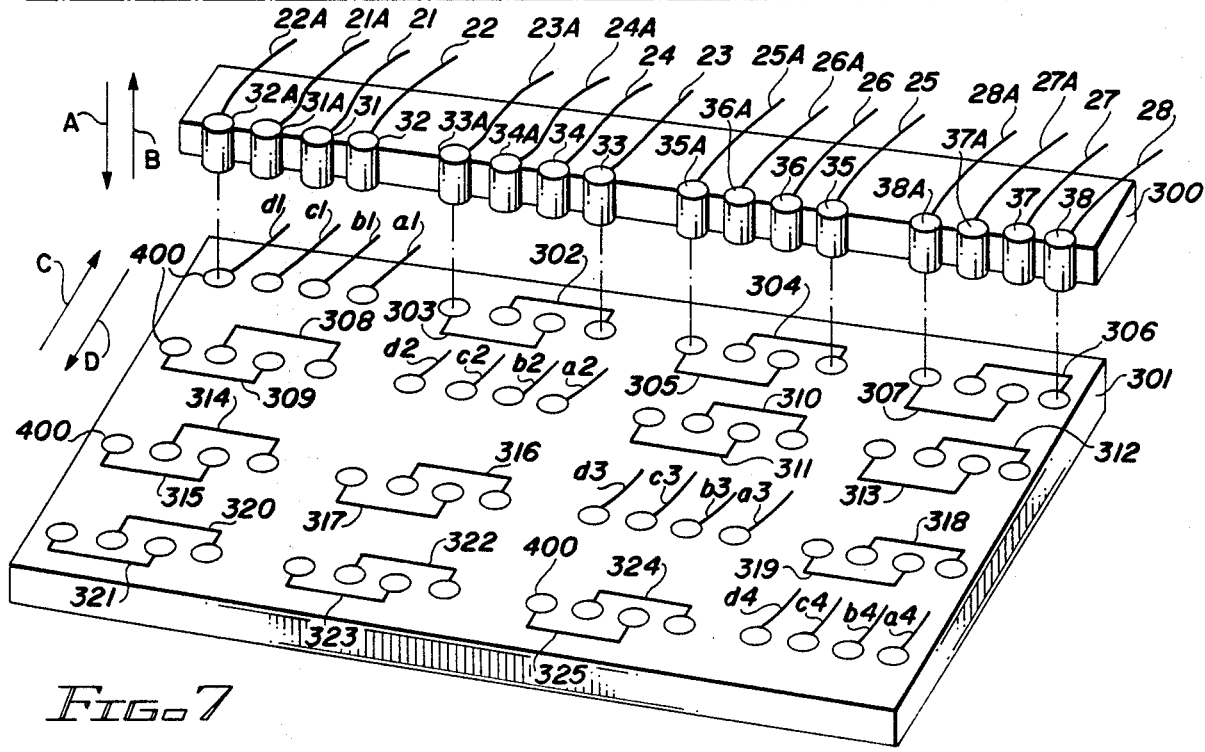

As would be appreciated by those of skill in the art, module 98 and terminal 101 function like a switching matrix which locates the wire pair carrying current and then directs current from that wire pair to the appropriate circuit(s) utilizing the current. Consequently, the switching matrix represented by module 98 and terminal 101 could take on a variety of forms. FIG. 7 illustrates another, more complicated, switching circuit which can be utilized in the practice of the invention.

In FIG. 7, pins 31–38 and 31A to 38A are mounted in elongate rectangular member 300. Wires 21 to 28 and 21A to 28A are connected to pins 31 to 38 and 31A to 38A, respectively, in the manner shown in FIG. 6. Member 300 is movable in the directions indicated by arrows A to D, either manually or by mechanical or other desired means known in the art. Sixty-four electrical contacts 400 are mounted in electrically insulated member 301. Wires 302 to 319 connect selected pairs of contacts 400 in the manner shown. Wires d1, d2, d3, and d4 each interconnect a different one of contacts 400 with contact 105. Wires c1, c2, c3, and c4 each interconnect a different one of contacts 400 with contact 104. Wires b1, b2, b3, and b4 each interconnect a different one of contacts 400 with contact 103. Wires a1, a2, a3, and a4 each interconnect a different one of contacts 400 with contact 102. Members 300 and 301 are constructed from material having a high electrical resistance. Member 300 is selectively moved between any one of four operative positions. In each of the operative positions pins 31 to 38 and 31A to 38A each touch a separate one of the contacts in one of the four elongate parallel rows of contacts 400 in member 301. In FIG. 7, member 300 is positioned such that pins 31 to 38 and 31A to 38A are each positioned directly above a contact 400 in the row including contacts interconnected by wires 302 to 307 and attached to wires d1, c1, b1, and a1. If, in FIG. 7, member 300 is moved downwardly in the direction of arrow A, pins 31 to 38 and 31A to 38A each touch a separate contact 400. For example, pin 32 touches the contact 400 connected to a1; pin 31 touches the contact 400 attached to wire b1; pin 38 touches a contact 400 attached to wire 306; pin 37A touches the other contact 400 attached to wire 306; etc. The second row of contacts 400 includes contact pairs interconnected by wires 308 to 313 and includes contacts 400 attached to wires a2, b2, c2 and d2. The third row of contacts 400 includes contact pairs interconnected by wires 314 to 319 and includes contacts connected to wires a3, b3, c3, and d3. The fourth row of contacts 400 includes contact pairs interconnected by wires 320 to 325 and includes contacts connected to wires a4, b4, c4, and d4.

When the pins in member 300 are touching contacts 400 in the first row of contacts in member 301, the amplification device 18 of the invention will operate when power is on the first pair 21, 22 of wires in telephone line 11. Current in line 22 travels through pins 32, a contact 400, wire a1 and contact 102. Current in line 21 travels through pin 31, a contact 400, wire b1, and contact 103. Signals carried in lines 23 to 28 are shunted through contacts 400 by wires 302 to 307 onto lines 23A to 28A. Lines 23A to 28A are connected to jack 12B and line 13. Consequently, signals in lines 23 to 28 are shunted past board 301 to telephone device 15.

When the pins in member 300 are touching contacts 400 in the second row of contacts in member 301, the amplification device of the invention will operate when power is on the second pair of wires 23 and 24 in telephone line 11. Current in line 23 travels through pin 33, a contact 400, wire a2, and contact 102. Current in line 24 travels through pin 34, a contact 400, wire b2, and contact 103. Signals carried in lines 21, 22, 25 to 28 are shunted through contacts 400 by wires 314 to 319 onto lines 21A, 22A, 25A to 28A. Lines 21A, 22A, 25A to 28A are connected to jack 12B and line 13. Consequently, signals in lines 21A, 22A, 25A to 28A are shunted past board 301 to telephone device 15.

When the pins in member 300 are touching contacts 400 in the third and fourth rows of contacts in member 301, the amplification device of the invention operates when power is on the third 25, 26 and fourth 27, 28 pair of wires, respectively, in telephone line 11.

As used herein, the term "handset" includes hand held telephone handsets with a receiver and/or microphone, includes headsets with a receiver and/or microphone, and includes telephone receivers and microphones supported or mounted other than in a handset or headset.

The circuit of FIG. 1 includes resistors R91, R100, R93, R94, RADJ, R101 and R102; includes capacitors C103, C101, and C100; and, diodes D1, D2 and D3.

The circuitry of FIG. 2 includes resistors Ra, Rb, Rc, Rd, Re, Ri, Rj, Rk, Rl, Rm, Rn, RVAR, and R104; and, capacitors Cl, Ca, Cb, Cc, Cd, Ce, Cf, and Cg.

The circuitry of FIG. 3 includes resistors R1, R2, R3, R4, R5, R6, R7, R8, R9, R10, R11,; bridge 120; and, capacitors C1, C2, C3, C4, C5, and C6.

The circuitry of FIG. 4 includes resistors R60, R61, R62, R63, R64, R65, R66, R67, R68, R69; and, capacitors C10, C11, C12, C13, C14, C15, C16, C17, and C18.

Having described my invention in such terms as to enable those skilled in the art to understand and practice it, and having identified the presently preferred embodiments thereof, I claim:

1. In combination with a telephone system, said system including
    a telephone device selected from the group consisting of a hybrid coil telephone and an electronic telephone,
    a system for servicing said telephone device,
    a telephone handset microphone normally connected to said telephone device and selected from the group consisting of an electret microphone, a dynamic microphone, and a carbon microphone,
    a telephone line interconnecting said telephone device and telephone device servicing system and including at least two pairs of wires, one of said wire pairs carrying power for said telephone device,
the improvement comprising an amplification device for interfacing between said telephone handset microphone and said telephone device, said amplification device including
    (a) current shunting means;
    (b) microphone output transmission means;
    (c) means for connecting said amplification device
        (i) to said handset microphone and intermediate said handset microphone and said telephone device such that output from said microphone passes through said microphone output transmission means to said telephone device,
        (ii) to said telephone line and intermediate said telephone line and said telephone device such that power in said telephone line passes through said current shunting means to said telephone device;
    said current shunting means shunting a selected amount of said power from said telephone line to operate said microphone output transmission means,
    said microphone output transmission means including
    (d) switch means to connect said microphone output
        (i) to a first amplifier means when said microphone is a carbon microphone, and
        (ii) to a second amplifier means when said microphone is selected from the group consisting of an electret microphone and a dynamic microphone;
    (e) summing means for summing the signals from said first and second amplifier means to produce an output signal; and,
    (f) interface means for transmitting said output signal from said summing means to said telephone device.

2. The combination of claim 1 wherein said current shunting means includes
    (a) current shunting circuitry having a pair of inputs and a pair of outputs, current entering said shunting circuitry through said inputs, said circuitry shunting a selected proportion of said current entering through said inputs, and the remaining unshunted proportion of said current exiting said shunting circuitry through said outputs;
(b) a first housing means carrying at least first and second pin grid arrays each including
  (i) a first pair of pins each connected to one of said inputs of said current shunting circuitry means,
  (ii) a second pair of pins each connected to one of said pairs of wires in side telephone line,
  (iii) a third pair of pins each connected to the other of said pair of wires in said telephone device, and
  (iv) a fourth pair of wires each connected to one of the outputs of said current shunting circuitry means;
  said pins in said first pin grid array being in a selected orientation with respect to one another, the orientation of said pins in said second pin grid array corresponding to the orientation of said pins in said first pin grid array;
(c) a second housing means carrying at least first and second socket grid arrays each including
  (i) a first pair of sockets each contacting a separate one of said first pair of pins in one of said pin grid arrays,
  (ii) a second pair of sockets each contacting a separate one of said second pair of pins in one of said pin grid arrays,
  (iii) a third pair of sockets each contacting a separate one of said third pair of pins in one of said pin grid arrays, and
  (iv) a fourth pair of sockets each contacting a separate one of said fourth pair of pins in one of said pin grid arrays,
  each of said first sockets in said first socket grid array being connected to a different one of said second sockets in said first socket grid array, and each of said third sockets in said first socket grid array being connected to a different one of said fourth sockets in said first socket grid array,
  each of said second sockets in said second socket grid array being connected to said a different one of said third sockets in said second socket grid array,
  said first and second housing means having at least two operative positions,
(d) a first operative position with said pins in said first pin grid array contacting said sockets in said first socket grid array and with said pins in said second pin grid array contacting said sockets in said second socket grid array; and,
(e) a second operative position with said pins in said first pin grid array contacting said sockets in said second socket grid array and with said pins in said second pin grid array contacting said sockets in said first socket grid array.

3. The combination of claim 2 including current source means to distribute said shunted selected proportion of said current to said microphone output transmission means.

4. In combination with a telephone system, said system including
a telephone device,
a system for servicing said telephone device,
a telephone handset microphone normally connected to said telephone device, a telephone line interconnecting said telephone device and telephone device servicing system and including at least two pairs of wires,
the improvement comprising an amplification device for interfacing between said telephone handset microphone and said telephone device, said amplification device including
(a) current shunting means;
(b) microphone output transmission means;
(c) means for connecting said amplification device
  (i) to said handset microphone intermediate said handset microphone and said telephone device such that output from said microphone passes through said microphone output transmission means to said telephone device,
  (ii) to said telephone line intermediate said telephone line and said telephone device such that power in said telephone line passes through said current shunting means to said telephone device;
said current shunting means shunting a selected amount of said power from said telephone line to operate said microphone output transmission means,
said microphone output transmission means including means to connect said output transmission means to receive said output of said microphone and transmit said output to said telephone device;
said current shunting means including
(d) current shunting circuitry having a pair of inputs and a pair of outputs entering said shunting circuitry through said inputs, said circuitry shunting a selected proportion of said current, and the remaining unshunted proportion of said current exiting said shunting circuitry through said outputs;
(e) a first housing means carrying at least first and second pin grid arrays each including
  (i) a first pair of pins each connected to one of said inputs of said current shunting circuitry means,
  (ii) a second pair of pins each connected to one of said pairs of wires in said telephone line,
  (iii) a third pair of pins each connected to the other of said pair of wires in said telephone device, and
  (iv) a fourth pair of wires each connected to one of the outputs of said current shunting circuitry means;
  said pins in said first pin grid array being in a selected orientation with respect to one another, the orientation of said pins in said second pin grid array corresponding to the orientation of said pins in said first pin grid array;
(f) a second housing means carrying at least first and second socket grid arrays each including
  (i) a first pair of sockets each contacting a separate said first pair of pins in one of said pin grid arrays,
  (ii) a second pair of sockets each contacting a separate one of second pair of pins in one of said pin grid arrays,
  (iii) a third pair of sockets each contacting a separate one of said third pair of pins in one of said pin grid arrays, an
  (iv) a fourth pair of sockets each contacting a separate one of said fourth pair of pins in one of said pin grid arrays,
  each of said first sockets in said first socket grid array being connected to a different one of said second sockets, and each of said third sockets in said first socket grid array being connected to a different one of said fourth sockets, each of said second sockets in said second socket grid array being connected to said a different one of said third sockets, said first and second housing means having at least two operative positions, (g) a first operative position with said pins in said first pin grid arrays contacting said sockets in said first socket grid array and with said pins in said second pin grid array contacting said sockets in said second socket grid array; and, (h) a second operative position with said pins in said first pin grid arrays contacting said sockets in said second socket grid array and with said pins in said second pin grid array contacting said sockets in said first socket grid array.

5. The combination of claim 1 wherein said current shunting means includes (a) current shunting circuitry having a pair of inputs and a pair of outputs, current entering said shunting circuitry through said inputs, said circuitry shunting a selected proportion of said current entering through said inputs, and the remaining unshunted proportion of said current exiting said shunting circuitry through said outputs;

(b) a switching matrix for identifying which of said wire pairs carries power and for connecting said wire pair to said inputs of said shunting circuitry.

* * * * *